United States Patent [19]
Takhim

[11] Patent Number: 5,989,508
[45] Date of Patent: Nov. 23, 1999

[54] LIQUID MEDIUM EXTRACTION PURIFICATION METHOD

[75] Inventor: Mohamed Takhim, Hay El Jadid OCP, No. 301, Kouribga, Morocco

[73] Assignees: Mohamed Takhim, Kouribqa, Morocco; Michel V. J. Culot, Waterloo, Belgium

[21] Appl. No.: 08/981,469

[22] PCT Filed: Jun. 21, 1996

[86] PCT No.: PCT/BE96/00066

§ 371 Date: Feb. 5, 1998

§ 102(e) Date: Feb. 5, 1998

[87] PCT Pub. No.: WO97/00714

PCT Pub. Date: Jan. 9, 1997

[30] Foreign Application Priority Data

Jun. 21, 1995 [BE] Belgium .................................. 9500548

[51] Int. Cl.⁶ .................................................. C01B 25/16
[52] U.S. Cl. .................... 423/321.1; 210/729; 423/658.5
[58] Field of Search .................... 210/725, 729, 210/321.1; 423/658.5, 659, 321.2

[56] References Cited

U.S. PATENT DOCUMENTS

| | | | |
|---|---|---|---|
| 2,729,334 | 1/1956 | Schwar et al. | 210/725 |
| 3,991,165 | 11/1976 | Williams | 423/321.2 |
| 4,643,883 | 2/1987 | Borchert et al. | 423/321.1 |
| 5,556,548 | 9/1996 | Mellen | 210/729 |

FOREIGN PATENT DOCUMENTS

| | | |
|---|---|---|
| 0401631 | 12/1990 | European Pat. Off. . |
| 2264774 | 10/1975 | France . |
| 2511345 | 9/1975 | Germany ............................ 423/321.1 |
| 38-11105 | 7/1963 | Japan .................... 423/321.1 |
| 23439 | of 0000 | Morocco . |
| 1438269 | 6/1976 | United Kingdom . |

OTHER PUBLICATIONS

Chemical Abstracts, vol. 60, No. 6, Mar. 16, 1964, Abstract 6515e.
Chemical Abstracts, vol. 86, No. 26, Jun. 27, 1977, Abstract 191964a.
Chemical Abstracts, vol. 10, vol. 10, Abstract 138052.
Abstract of JP–7179 in Cellulose, Lignin and Paper, Chap. 23, 1957, col. 18606.

*Primary Examiner*—Wayne Langel
*Attorney, Agent, or Firm*—Watson Cole Grindle Watson, PLLC

[57] ABSTRACT

Method of purification by extraction of at least one substance to be isolated from a liquid medium, comprising an addition to the latter of an organic compound, entrainable by a vapor, which has a molecule with an acidic-basic character in the Lewis sense due to at least one atom of N, O and/or S forming one or more active sites provided with a free electron pair, this pair or these pairs being in resonance with at least one other pair carried by the molecule, this addition being carried out in a quantity sufficient to give rise to a product of an equilibrium reaction between the organic compound and the said at least one substance to be isolated, and sufficient to cause a precipitation of this equilibrium reaction product, a filtration of the precipitate and an entrainment by vapor of the organic compound from the precipitate, with a yield of the substance to be isolated in purified form.

23 Claims, 1 Drawing Sheet

LIQUID MEDIUM EXTRACTION PURIFICATION METHOD

BACKGROUND OF THE INVENTION

1. Field of the Invention

The present invention relates to a method of purification by extraction of at least one substance to be isolated from a liquid medium.

2. The Prior Art

Many of the industrial methods of purification now practised are included in the following list, with their disadvantages in parentheses: salting-out (distillation of the agent modifying the solubility), precipitation (acid or base from displacement of the precipitating agent and distillation sometimes azeotropic), liquid/liquid extraction (sometimes with two expensive solvents, with regeneration and progressive loss of efficiency of the solvents), ionic flotation (long and costly), ion-exchange resins (difficult to apply in acid media) and electrolysis (not very efficient, high energy consumption).

In the special case of the production of pure or extra-pure phosphoric acid, if synthesis is excluded, this is now made principally by two methods: either by the "dry" method, with high energy consumption, using "ore-coke-silica" furnaces at more than 1000° C. followed by bubbling through $H_2O$ of the $P_2O_5$ extracted from it; or by the "wet" method using attack by an acid, mainly sulphuric acid (whose evolution of heat is quite considerable), but also nitric acid (corrosive with release of noxious NOx), hydrochloric acid (very corrosive), or perchloric acid (danger of explosion), on phosphate ores given prior treatment (by calcination, crushing, screening) yielding a crude phosphoric acid solution. The Ca salts formed following the acid attack are removed by crystallisation of the sulphates (from 80° C. to 110° C.) or the nitrates (at a temperature <−5° C. and with a low filterability) or again by carrying out a liquid/liquid extraction of the phosphoric acid, leaving the calcium chlorides untouched. The crude acid solutions are then concentrated by evaporation (noxious vapours) up to a 40% or 50% $P_2O_5$ content (crude solution, sometimes called "green" or "black" acid in the case of attack using sulphuric acid).

The wet method using sulphuric acid, which covers the majority of the world tonnage of economically valuable phosphates, then directs the green acid either to the production of phosphate salts (for example, of superphosphates and nitrogenous phosphates for fertilisers) or to purification leading to pure or extra-pure phosphoric acid.

The aim of the method according to the invention is to overcome the disadvantages, indicated in parentheses, of the aforesaid present industrial methods of purification.

Methods are also known for the purification of aqueous acid solutions, such as crude phosphoric acid solutions, in which a substance is introduced which, with the acid, forms a precipitate in the form of a phosphate. Known examples are the addition of urea to obtain urea phosphate crystals (Chemical Abstracts 84:152820 of DE-A-2511345), that of melamine to form melamine phosphate (Chemical Abstracts 10: 138052) and that of 1,4-dioxan to form an addition product (salt) of this substance and $H_3PO_4$ (Chemical Abstracts of the Japanese patent application Kokai JP 51143597).

These methods turn out to be relatively complicated when it comes to separating the phosphoric acid from the salt or from the adduct formed. Use is generally made of nitric acid to displace the phosphoric acid and to form a nitrate of the precipitating substance. In other cases, through elution using an aqueous ammonia solution, ammonium phosphate is produced, isolating the substance used for the precipitation and thus enabling it to be recycled.

A Moroccan patent no 23439 is also known, in which the phosphoric acid is subjected to the action of an MSA compound of unspecified composition which puts the phosphoric acid into a form which can be purified by simple filtration. The phosphoric acid and the MSA compound are then recovered separately in regeneration reactors. The regeneration step is not indicated in this document either.

In Cellulose, Lignin and Paper-23, 1957, column 18606, a description is given of the precipitation, using aniline, of aniline-$H_3PO_4$ from a solution containing dissolved phosphates. Once again this adduct is treated by $NH_3$ in order to produce ammonium phosphate and the aniline can be extracted and purified from the reaction medium only after several operations, including a purification with $Ca(OH)_2$ and an extraction with benzene.

In Chemical Abstracts, vol 60, column 6515, a description is given of a method for recovering phosphoric acid from a solution containing phosphoric acid or phosphates by treatment with an aromatic amine, particularly aniline or p-toluidine, by heating to 102° C. This gives an amine phosphate of high purity. However, this reference does not explain how to recover pure phosphoric acid from the amine phosphate.

All these methods describe an operation which is generally well known, that of a joint precipitation of the substance added to the liquid medium to be treated and of a substance which occurs in the treated liquid medium. These methods are then used to produce a derivative (a salt, for example) of the acid contained in the liquid medium or of the precipitating agent, without managing to produce this substance (the acid) in the pure state, and simultaneously to recover the precipitating agent in a recyclable manner. The formation of new salts necessitates the introduction of new substances, such as $HNO_3$ or $NH_3$, into the liquid medium.

The aim of the present invention is to solve the problems of cost, pollution and energy consumption associated with most of the methods for separating substances from a liquid medium.

SUMMARY OF THE INVENTION

These problems are solved by a method of purification by extraction of at least one substance to be isolated from a liquid medium, comprising an addition to the liquid medium of an organic compound, which can be entrained by a vapour and which has a molecule of acidic-basic character in the Lewis sense due to at least one atom of N, O and/or S forming one or more active sites provided with a free electron pair, the free electron pair or pairs being in resonance with at least one other pair carried by the molecule, this compound possibly carrying as well at least one hydrogen atom subjected to an electronegativity coming from one of the said active sites, this addition being carried out in a quantity sufficient to give rise to an equilibrium reaction product between the organic compound and the said at least one substance to be isolated, a reaction in which the difference in pKa between the compound and substance lies between 0.1 and 5, and sufficient to cause a precipitation of this equilibrium reaction product in the form of a precipitate, an isolation by filtration of the precipitate and removal of a filtrate, an entrainment by the aforesaid vapour of the above-mentioned organic compound from the precipitate, and a yield in purified and isolated form of the said at least one substance to be isolated.

According to the invention, therefore, a substance of acidic-basic character in the Lewis sense is used, a substance which is capable with acids of forming an equilibrium reaction product using its electron pair or pairs and which, possibly in addition, can react in a basic medium. In effect, this compound may with advantage have labile hydrogen atoms, which are subjected to an electronegativity coming from one of the said active sites, enabling protons to be released. The pKa difference between the reagents giving rise to the above-mentioned precipitate characterises an equilibrium reaction. Outside the range pKa =0.1 to 5, the reaction between the organic compound and the substance to be isolated either does not take place or it takes place to the point where a complete reaction is achieved.

In order to allow good entrainment by a vapour, in conformity with the invention, the organic compound is with advantage not miscible with this vapour, or is only partially so. With this condition, during the entrainment, an increasingly vigorous volatilisation of the organic compound takes place, which tries to respect the equilibrium between the partial pressures of the vapour and of the entrained molecule. This lack of equilibrium has the effect, firstly, of fixing all that remains of the organic compound according to the invention which has not reacted with the substance to be isolated so as to re-establish equilibrium between the product subjected to entrainment by the vapour and the substance to be isolated, and secondly of completely isolating the required substance, while all the organic compound has been entrained. Entrainment by vapour is a well-known technique (see for example, Encyclopedia Britannica, 1970 edition, vol. 7, p. 497, Steam Distillation).

With advantage, the organic compound according to the invention is an aromatic amine, such as aniline, p-toluidine or 3-methyl-2-naphthylamine. It is of course also possible to use derivatives or isomers of these substances. Amongst these, for example, may be quoted their salts, such as the phosphate, sulphate or chloride of aniline, or lower alkyl derivatives, for example methylaniline, or nitrogenous derivatives, for example nitroaniline. Other substances could also satisfy the criteria set out in the method. These are, for example, pyrrole, thiophen, o-cresol, $C_7H_8O$ (particularly m-cresol), $C_6H_{10}ClNH_2$ (particularly monochloro-2-methyl-2-pentene), $C_5H_{10}S$ (particularly ethiothiol-l-propene) or $C_4H_6Cl_2O_2$ (particularly ethyl dichloroacetate), as well as their derivatives or isomers.

It should be pointed out that it has long been known that aniline easily becomes volatile in the presence of steam (The Merck Index, 10th edition, 1983, no 681).

According to an advantageous form of the method according to the invention, the steam distillation stage comprises an injection of steam over the precipitate in the state of a filter cake, and an entrainment by the injected steam of the organic compound. The filter cake, which occurs in a form which is very stable and perfectly capable of being stored under ambient conditions, may thus be subjected either directly, or subsequently and/or elsewhere, to steam distillation without prior treatment. In the field of $H_3PO_4$ purification, this makes it possible to avoid the great problems of storage and transport of the unstable "green" acid of the current technique.

Depending on the nature of the organic compound to be entrained, a vapour of a predetermined substance will be chosen. For example, steam in the case of aniline, benzene vapour in the case of
pyrrole or thiophen, or ether vapour for

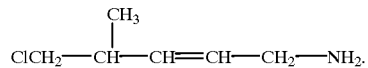

It is possible to provide for modes of entrainment by vapour other than that by injection, particularly, in the case of steam distillation, by using a mixture of the precipitate and liquid water. The water is then heated to boiling point and this entrains with it the organic compound to be entrained.

A preferred form of the method according to the invention comprises the addition of the organic compound in a crude state and also, following the stage of entrainment by vapour, a separation of the organic compound in the pure state from the liquefied entrainment vapour, and possibly a recycling of this pure organic compound or of the organic compound with the liquefied entrainment vapour in the addition stage. In this way, it is therefore possible to carry out a simultaneous purification of the agent used to extract in the purified state a substance contained in a liquid medium. The impurities both in the aforesaid crude organic compound and in the liquid medium to be treated are recovered in the filtrate obtained during the filtration of the precipitate.

According to an improved form of the method according to the invention, it comprises:

a first addition of the said organic compound to the liquid medium in a quantity appropriate for obtaining a modification of the solubility in the medium of one or more impurities present by causing a precipitation or coprecipitation of the said impurities, a separation of the precipitated or coprecipitated impurity or impurities, a second addition to the remaining liquid medium of the said organic compound which, added to the first addition, reaches the said sufficient quantity to cause a precipitation of the said equilibrium reaction product. In such a case, the organic compound acting as a modifier of solubility is capable of inducing, before the precipitation in which it participates itself, a precipitation of one or more impurities. In the case of the purification of phosphoric acid, a first addition of aniline can in this way modify the solubility by modification of the pH and can produce a precipitation of calcium sulphate in the pure state.

A stage of solubility modification must be understood in the present invention to cover not only a modification of the pH but also, for example, a change of solvent or any other technique of a similar type known to one skilled in the art.

Other characteristics of the invention are indicated in the claims which follow.

Other details and special features of the invention will also emerge from the description given below, as a non-limiting example, with reference to the appended drawings.

DETAILED DESCRIPTION OF THE PREFERRED EMBODIMENT

In the various drawings, identical or similar elements are denoted by the same reference numbers.

In the embodiments illustrated, the method according to the invention is explained by basing it on a particular mode of execution, that of the production and purification of phosphoric acid. An equivalent method could be applied to other acids, such as sulphuric acid, or again to mother liquors arising from their production.

It is also possible, given the acidic-basic character of the organic compound introduced in the method, to use a similar method for the purification of media with a less pronounced acidic or basic character, particularly for the softening of tap water or the desalination of seawater. Another area of application consists of the treatment of discharges from industries such as paper-making and sugar refining or from factories making or treating dyestuffs; the substances capable of being extracted from their effluents by the method described are, for example, benzoic, carboxylic or acetic acids, their salts, and compounds rich in metallic ions ($Cr^3$ for example) or other organic compounds resistant to oxidation processes, such as benzene, fatty acids and organic dyestuffs.

Figure 1:
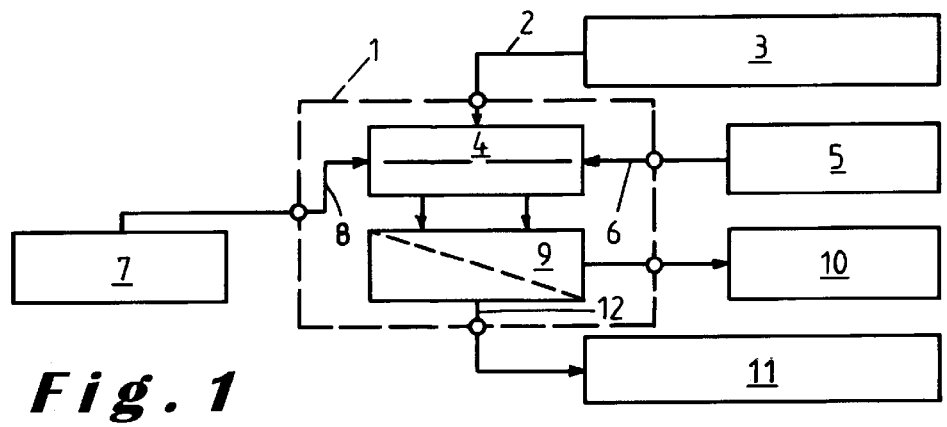
FIG. 1 represents an embodiment of a unit for modifying the solubility of the liquid to be treated, which may be used in the method according to the invention.

In the unit for changing solubility 1 illustrated in FIG. 1, a crude solution of phosphoric acid 3 resulting for example from attacking the ore with sulphuric acid (the wet method) is introduced into a receptacle 4 through the duct 2. This solution is diluted to a concentration of approximately 20 to 25% $H_3PO_4$, for example by adding, through 8, mother liquors 7 resulting from the method. An organic compound 5 according to the invention, inexpensive crude aniline for example, is introduced through 6 into the receptacle 4. With advantage, the aniline is dispersed in the form of an emulsion/aqueous solution. The aniline introduced, as a weak base, induces in the acid medium a change in pH to bring it within a range lying between 1.3 and 5, preferably between 2.0 and 3.5, which, in the present example, produces, without any input of energy, a precipitation of calcium sulphate in a form which can be filtered much more easily than in current methods. Unlike the methods according to the current state of the art, where carbonates are added to the "green acid", non-hydrated sulphates are obtained here with very low concentrations of elements such as U, Cs, Cd, As, F, etc . . . which remain in the filtrate. The acid solution treated in the receptacle 4 is filtered in the filter 9. The calcium sulphate precipitate is recovered in 10 to be exploited for example in the plaster of Paris industry. The filtrate 11 contains a solution of $H_3PO_4$, aniline and impurities other than those already filtered, and it is discharged through 12 from the filter 9.

Figure 2:
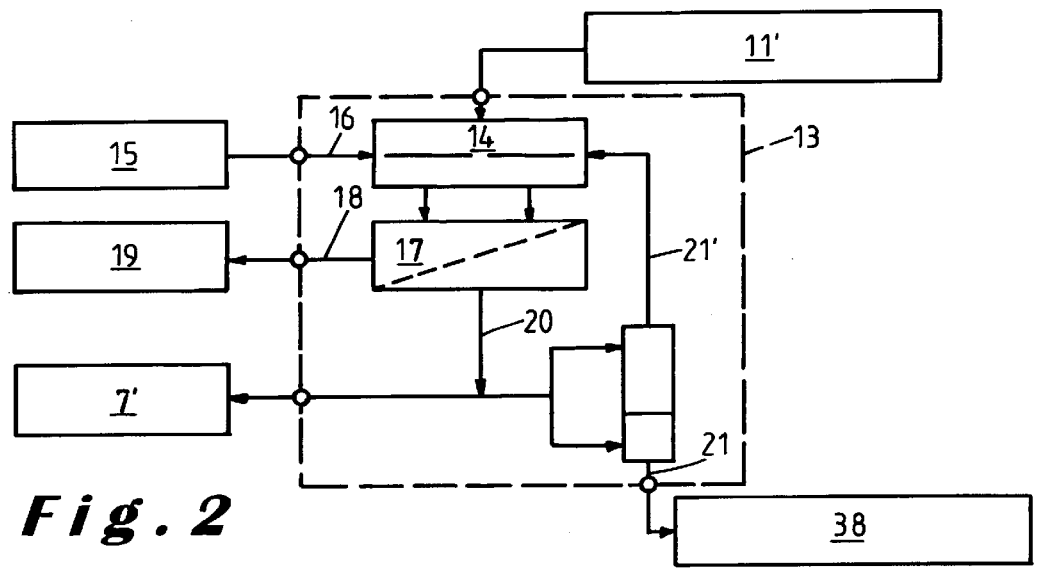
FIG. 2 represents an embodiment of the precipitation unit which may be used in the method according to the invention.

The liquid 11' (the filtrate 11 of unit 1) is then passed into the precipitation unit 13 represented in FIG. 2, and it is introduced into the receptacle 14 at a phosphoric acid concentration advantageously lying between 12% and 40%. Also introduced through 16, preferably in dispersed form, is a complementary quantity of crude aniline 15 so that the ratio of the weights of aniline and acid lies between 0.5 and 1.5, preferably 1.2. This operation is with advantage carried out between 10° C. and 80° C. Preferably, agitation is provided for in the receptacle 14 by an ordinary agitator, not represented. With advantage, the turbulent state obtained will have a coefficient $N^3D^2$ lying between 2 and 4, N being the speed in revolutions per second and D the diameter in metres of the agitator. This agitation is provided in order to allow adequate dispersion of the aniline in the liquid medium and to avoid an accumulation of precipitates at the point where addition takes place.

It is obvious that these data are valid for the case of the addition of aniline to a phosphoric acid solution and that they may be modified depending on the substance to be purified and the organic compound used for this purpose.

Within a period of 5 to 30 minutes, a precipitate of very easily filterable aniline phosphate $C_6H_5NH_2.H_3PO_4$ is formed in the receptacle 14. The mixture formed is transferred to the filter 17, which may be any type of filter suitable for this operation, for example a filter press. The precipitate formed is removed through 18 from the filter 17 in the form of a filter cake 19 consisting in the present example of crystals of aniline phosphate. This precipitate might possibly at this stage be washed by a saturated solution of aniline phosphate.

Unlike the unstable intermediate solutions obtained in the methods of the prior art, which give rise to considerable costs and the trouble of cleaning the storage tanks and cargo holds or difficulties in titration because of suspensions and precipitations subsequent to the filtration, the aniline phosphate filter cake is stable at room temperature. It can easily be stored in order to extract the phosphoric acid from it, later or elsewhere, simply by using steam, as will be described later.

A filtrate, known as the mother liquor, is obtained through 20. It may be partly recycled in the receptacle 14, through the intermediary of the duct 21', in order to adjust the $P_2O_5$ concentration of the acid to be treated, and in the receptacle 4 through the intermediary of the duct 8 and the reservoir 7, already represented in FIG. 1 (reservoir 7' in FIG. 2). These multiple recyclings also make it possible to minimise the losses of $P_2O_5$ between the crude solution and the filter cake 19. The non-recycled mother liquors 38 contain only quantities of $P_2O_5$ not exceeding 20% and small quantities of sulphuric acid and aniline, and they also contain water and impurities such as F, Cd, As, etc . . . The non-recycled mother liquors 38 are discharged from unit 13 through 21, from where they may possibly be treated as described below. The removal of all the undesirable elements by the filtrate 38, so as to keep only the purified phosphoric acid and the purified aniline in the filter cake, makes it possible to consider exploiting phosphate deposits hitherto not exploited because of too high a concentration of polluting elements, while at the same time obtaining pure gypsum.

Figure 3:
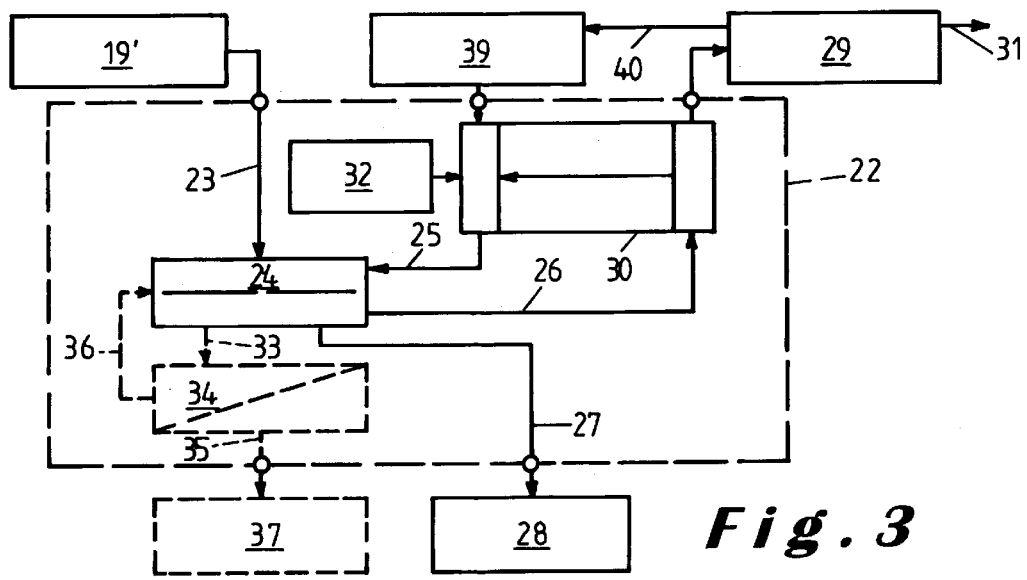
FIG. 3 represents an embodiment of the regeneration unit which may be used in the method according to the invention.

FIG. 3 illustrates a unit 22 for entrainment by vapour according to the invention, in the present case a steam distillation unit.

This unit comprises a receptacle 24 into which, via 23, the filter cake 19' (cake 19 of the precipitation unit 13) is introduced. Simultaneously, water 39 is introduced in the form of steam through 25 into the receptacle 24. In the example illustrated, hydrolysis of the filtrate is envisaged by injection into the filter cake of approximately 1 to 2 kg of steam per kg of cake. The latter will advantageously have a temperature lying between 40° C. and 200° C., preferably between 40° C. and 110° C. The steam distillation will therefore preferably be carried out under vacuum. The acid, obtained through 33, is filtered in the receptacle 34, from which pure phosphoric acid is extracted through 35. The said acid no longer requires concentrating, since the concentration can be adjusted directly through the ratio used between the weights of the steam and the $P_2O_5$ of the cake. The cake 36, consisting of the possibly non-hydrolysed fraction in 24, is recycled to be subjected once again to the action of the steam.

From the receptacle 24, the H₂O and aniline vapour is removed through 26 and transferred for example to a decanting device 29, where the two components, which are almost non-miscible in the liquid state, are easily separated. During this transfer, it is possible to envisage passage through a heat recuperator 30, enabling heat to be recovered for the water 39 entering the unit 22. The main input of heat to the water entering the unit 22, or the only input as the case may be, is provided elsewhere by means of a heating device 32.

Through the duct 40, the water from the decanter 29 may be recycled in steam distillation while, through 31, pure aniline may be recycled in 5 (FIG. 1) and/or in 15 (FIG. 2), or may be used in other industrial areas. The method thus involves a simultaneous double purification, that of the phosphoric acid and that of the aniline.

In a variant, between the recovery of the filter cake 19 through 18 (see FIG. 2) and its introduction through 23 into the receptacle 24 (cake 19' in FIG. 3), it is also possible to envisage the introduction of the cake 19 into a reactor not represented, in which the cake is mixed with an alkaline or nitrogenous compound, for example KOH, NH₃ or urea. The aniline is then displaced from its precipitate in favour of a phosphate of an alkali metal, of ammonium or of urea, for example. This product is introduced into the receptacle 24, the aniline is entrained in the steam as described above and the required phosphate solution is recovered through 27 in the receptacle 28.

The pure phosphoric acid obtained in 37 may also be increased in quality by a standard treatment of crystallisation and decolourising, for example with hydrogen peroxide and activated carbon, which removes organic matter from it, particularly any remaining traces of aniline if these are undesirable in the applications of the phosphoric acid.

It should be noted that the passage into a unit for changing solubility 1, such as that illustrated in FIG. 1, is not necessarily essential in every case. It is possible, for example, to imagine having to treat a "green acid", i.e. a crude acid already partially purified, particularly from sulphates, by standard methods, and having a P₂O₅ content from 40 to 50%. In this case, the solution to be treated 11', i.e. the green acid in this case, is introduced directly into the receptacle 14 of the precipitation unit illustrated in FIG. 2.

As was said above, the method illustrated is given as an example with aniline and phosphoric acid. It is possible to provide for the purification and separation of other substances and, for example, to take advantage of this in order to exploit certain substances contained in a liquid medium.

We could take, once again as a non-limiting example, the mother liquors 38 recovered through 21 at the output from the unit in FIG. 2.

It is possible to envisage making this liquid medium pass through a new stage corresponding to those described previously. In the unit illustrated in FIG. 1, the solution 3 therefore consists of these mother liquors containing impurities such as F, Cd, As, etc. . . . and other exploitable components. This solution is introduced into the receptacle 4 and its pH is modified by an input of aniline 5, possibly crude, in such a way as to achieve, in the present case, a range from 2.4 to 6.5, preferably from 3.6 to 6.5. At this pH the filtrate is cleared of impurities in the form of a precipitate which is removed to 10 by filtration in the filter 9. The filtrate 11 is then introduced into the precipitation unit illustrated in FIG. 2 (medium 11'). The precipitate is filtered in 17 in the form of a filter cake 19, and it is then subjected to treatment in a steam distillation unit as illustrated in FIG. 3. There, the steam entrains purified aniline, which is separated for example by decanting in 29, while a concentrate of impurities is recovered in 28 having a volume considerably smaller, for the same initial filtrate, than the concentrates obtained by current methods.

In a variant, this same technique may be used to extract, this time in successive stages, different groups of impurities from the mother liquors 38 recovered through 21 at the output from the unit in FIG. 2. For that purpose, the method operates over the ranges of pH and temperature, making it possible, for example, to isolate first fluorine, cadmium and arsenic, then iron, magnesium and aluminium and finally radioactive heavy metals and rare earths.

The present invention will now be explained in a more detailed manner using non-limiting examples of its execution.

EXAMPLE 1

Into an agitated reactor, 500 ml of previously obtained phosphoric acid are introduced, the said acid containing 10% of P₂O₅, and 30 g of ore (33% P₂O₅) are added to it. The reaction occurs between 35° C. and 40° C. for ½ hour; 7 g of the non-attacked dry residue are separated using a filter; 480 ml of filtrate are reintroduced into another agitated reactor, where 25 g of H₂SO₄ with a concentration higher than 99% are added. The reaction takes place at a temperature between 35° C. and 40° C. for ½ hour, the hydrated calcium sulphate formed is separated by a simple filtration; the weight of the wet cake is 92 g and has a purity higher than 96%; the volume of filtrate is 320.5 ml and the cake is washed with 180 ml of H₂O.

In another reactor, 67.83 ml of the filtrate and 25 g of the washing water are mixed with 20 g of aniline; the reaction takes place in 15 minutes at a temperature of 20° C.; the pulp formed is passed through a filter where 35 g of wet aniline phosphate cake with a purity of 99% and 71.75 g of filtrate are recovered.

The phosphoric acid obtained after separation of the aniline by entrainment is 10.78 g with 54% P₂O₅.

The analysis is as follows:

| | |
|---|---|
| P₂O₅ | 54% |
| Ca | <0.05 |
| F | <0.05 |
| SO₄ | 1.5% |
| Cd | <1 ppm |
| As | <1.5 ppm |
| Fe | <10 ppm |
| Al | 41.3 ppm |
| Mg | 80 ppm |
| K | 7 ppm |
| Na | <10 ppm |

The cake and the filtrate are then respectively subjected to operations like those described in Example 2 and in Example 5 below.

EXAMPLE 2

Use is made of 100 g of crude phosphoric acid solution obtained by an ordinary wet method and having a P₂O₅, content of 47.7% (green acid). This solution corresponds to the following analysis:

Concentrations in µg/ml (ppm):

| As: | 23 | Mg: | 3050 | K: | 728 |
|---|---|---|---|---|---|
| Cu: | 132 | Na: | 803 | Si: | 239 |
| Al: | 491 | Pb: | 1 | U: | 92 |
| Ca: | 96 | Cd: | 2 | F$^-$: | 1260 |
| Fe: | 2750 | Ni: | 12 | SO$_4^-$: | 33400 |

Concentration in µg/ml (ppb):

| Hg: | 5 | | | | |
|---|---|---|---|---|---|

It is diluted in the receptacle 14 of unit 13 (FIG. 2) with 238 g water, to take its P$_2$O$_5$ concentration to 14.1%. To this is then added 74 g of aniline. After precipitation, filtering and washing the precipitate (cake) of "aniline.H$_3$PO$_4$", 76 g (dry weight) of the cake are removed to 19 and 162.4 g of filtrate are removed to 38, the latter intended particularly to follow subsequent operations leading to exploitation. The cake is then introduced into the receptacle 24 of the unit 22 (FIG. 3) where the action of the steam on the cake with a weight ratio of 2:1 releases phosphoric acid (into 28), and this corresponds to the following analysis, characteristic of a purified solution with a P$_2$O$_5$ content of 41.5%:

Concentrations in µg/ml:

| As: | <0.5 | Mg: | 59.6 | K: | <3 |
|---|---|---|---|---|---|
| Cu: | 1.4 | Na: | 6.3 | Si: | 5.2 |
| Al: | 4.6 | Pb: | <1 | U: | <2 |
| Ca: | 36 | Cd: | 1.6 | F$^-$: | 13.2 |
| Fe: | 32 | Ni: | 1.3 | SO$_4^-$: | (32) |

Concentration in ng/ml (ppb):

| Hg: | <5 | | | | |
|---|---|---|---|---|---|

EXAMPLE 3

Into an agitated reactor, 0.5 liter of phosphoric acid obtained by a wet method with sulphuric acid is introduced, containing 55% of P$_2$O$_5$, 67 ppm of Cd and 133 ppm of U. After dilution, 520 g of aniline are added to this. The precipitate formed is filtered and washed. After hydrolysis of the precipitate by steam and entrainment of the aniline by this steam, the recovered phosphoric acid displays a 98.5% rate of removal of impurities: it contains less than 1 ppm of Cd and less than 2 ppm of U.

EXAMPLE 4

Into an agitated reactor, 0.35 liter of phosphoric acid obtained by a wet sulphuric method is introduced, containing 32.4% of P$_2$O$_5$, 40 ppm of Cd and 78 ppm of U. 260 g of aniline are added to this. A precipitate is formed and is washed and filtered. After entrainment by aniline vapour, the remaining phosphoric acid contains less than 0.5 ppm of Cd and less than 1 ppm of U.

EXAMPLE 5

Into an agitated reactor, 500 g of aqueous filtrate obtained in 38 of unit 13 in FIG. 2 are introduced. It corresponds to the following analysis: 7% of P$_2$O$_5$, 0.1% of Fe$_2$O$_3$ and 0.12% of Al$_2$O$_3$, together with 0.03% of CaO. This is mixed with 85 g of aniline at a pH >5 at 102° C. A precipitate of impurities with a weight of 7.5 g is formed and is separated for filtration, the filtrate then being cooled to 10° C. to crystallise 130 g of aniline phosphate with a purity higher than 99%. The cake is treated according to FIG. 3.

It should be understood that the present invention is in no way limited to the modes of execution described above and that many modifications could be made to it without going outside the scope of the claims.

It would be possible, for example, to imagine that the method could also use, during its various successive stages, not just the same organic compound in every case, but different organic compounds as long as they all conform to the invention.

I claim:

1. A method for purifying phosphoric acid and/or derivatives thereof by extraction from a liquid medium containing phosphoric acid comprising the steps of:
    (a) adding to the liquid medium containing phosphoric acid an organic compound which can be entrained by a vapour and which has a molecule of Lewis acid type in a quantity sufficient to produce an equilibrium reaction product between the organic compound and the phosphoric acid, the difference in pKa between the organic compound and phosphoric acid being between 0.1 and 5, said equilibrium reaction product forming a precipitate,
    (b) filter separating the precipitate from a filtrate containing impurities,
    (c) contacting the precipitate with a vapor so as to entrain the organic compound therein and remove said organic compound from the precipitate, and
    (d) recovering said phosphoric acid and/or derivatives thereof in a purified and isolated form.

2. A method according to claim 1 wherein the organic compound is selected from the group consisting of the aromatic amines, pyrrole, thiophen, ocresol, m-cresol, monochloro-2-methyl-2-pentene, ethiothiol-1-propene, ethyl dichloroacetate, derivatives thereof, and isomers thereof.

3. A method according to claim 2, wherein the aromatic amine is selected from the group consisting of aniline, p-toluidine, 3-methyl-2-naphthylamine, salts thereof, derivatives thereof and isomers thereof.

4. A method according to claim 1, including agitating the liquid medium and the organic compound in step (a).

5. A method according to claim 1, wherein step (a) is carried out at a temperature between 10 and 80° C.

6. A method according to claim 1, wherein step (b) takes place under vacuum.

7. A method according to claim 1, wherein during step (b) the filtered precipitate is subjected to washing by an aqueous solution saturated with the equilibrium reaction product.

8. A method according to claim 1, wherein the precipitate is a filter cake and step (c) comprises injecting vapour over the filter cake.

9. A method according to claim 8, wherein step (c) comprises application of 1 to 2 kg of steam per kg of filter cake at a temperature between 40 and 110° C.

10. A method according to claim 1, wherein step (C) comprises mixing the filtered precipitate with water, and boiling the water which, in the vapour state, entrains the organic compound.

11. A method according to claim 1, further comprising treatment of the phosphoric acid and/or its derivatives obtained in step (d) in order to remove traces of organic compound.

12. A method according to claim 11, wherein the purified phosphoric acid and/or derivatives thereof are treated with hydrogen peroxide and subsequently by activated carbon for obtaining a decolorized form of the phosphoric acid and/or derivatives thereof.

13. A method according to claim 1, further comprising, after step (b), a step of storing and/or transporting the filtered precipitate.

14. A method according to claim 1, further comprising adding the organic compound in a crude state to the liquid medium and separating the organic compound in a purified state from the liquefied entrainment vapour.

15. A method according to claim 1, further comprising a supplementary addition of said organic compound to the said separated filtrate in order to reach a sufficient quantity to cause a precipitation and/or a coprecipitation of salts of said organic compound with one or more impurities, contained in the separate filtrate, a separation of the precipitates and/or coprecipitates, in the form of a filter cake, and of a new filtrate, an entrainment by vapour of the organic compound from the filter cake, and a yield of concentrate of impurities.

16. A method according to claim 1, comprising a first addition of said organic compound to the liquid medium, in a quantity appropriate for obtaining a modification of the solubility of one or more impurities present in the liquid medium by causing a precipitation or coprecipitation of said impurities, a separation of the precipitated or coprecipitated impurity or impurities, a second addition of the remaining liquid medium of said organic compound which, added to the first addition, reaches said sufficient quantity to cause a precipitation of said equilibrium reaction product, in the form of a precipitate, a separation by filtration of the precipitate and of a filtrate, an entrainment by the aforesaid vapour of the organic compound from the precipitate, and a yield in purified and isolated form of the phosphoric acid and/or its derivatives to be isolated.

17. A method according to claim 1, wherein the liquid medium is an aqueous solution of crude phosphoric acid, the method comprising the step of:

adding aniline or a derivative thereof to said aqueous solution, in order to reach said sufficient quantity of cause a precipitation of phosphate of said aniline or derivative thereof, isolating the phosphate of aniline or derivative thereof in the form of a filter cake, separating a filtrate containing impurities, entraining by vapour of the pure aniline or derivative thereof from the filter cake, and recovering purified phosphoric acid.

18. A method according to claim 17, comprising a prior adjustment of the $H_3PO_4$ concentration in the aqueous solution of phosphoric acid, to which is added a sufficient quantity of aniline or of a derivative thereof to cause a precipitation of the phosphate of aniline or derivative thereof, to a value lying between 7% and 40%.

19. A method according to claim 17 further comprising the steps of:

a supplementary addition of aniline or of a derivative thereof to said separated filtrate to reach a sufficient quantity to cause a precipitation and/or coprecipitation of salts of aniline or derivative thereof with one or more impurities, a separation of the precipitates and/or coprecipitates, in the form of a filter cake, and a yield of a concentrate of impurities.

20. A method according to claim 17, further comprising a sulphuric acid attack on a phosphate ore for forming an attack solution, an input to the attack solution of a first part of said quantity of the aniline or derivative thereof, so as to achieve a pH value lying between 1.3 and 5, at which a precipitation of calcium sulphate take place, separating by filtration calcium sulphate in the pure state, and of a filtrate in the form of said aqueous solution of crude phosphoric acid, and adding to said aqueous solution a second part of the aniline or derivative thereof which, added to the first part, reaches said sufficient quantity to cause a precipitation of the phosphate of the aniline or derivative thereof.

21. A method according to claim 20, wherein the pH value is between 2.0 and 3.5.

22. A method according to claim 1, wherein the liquid medium is an aqueous solution of crude phosphoric acid, the method comprising the steps of:

adding aniline or a derivative thereof to said aqueous solution in order to reach said sufficient quantity to cause to precipitation of phosphate of said aniline or derivative thereof, isolating the phosphate of aniline or derivative thereof in the form of a precipitate, removing a filtrate containing impurities, displacing aniline or derivative thereof within the precipitate by an alkaline or nitrogenous compound, entraining by vapour of the pure aniline or derivative thereof from the precipitate, and recovering purified salt of phosphoric acid with this alkaline or nitrogenous compound.

23. A method according to claim 1, further comprising a recycling of the organic compound issuing from said stage of entrainment towards said stage of addition.

* * * * *